United States Patent
Hedman et al.

(10) Patent No.: US 11,794,574 B2
(45) Date of Patent: Oct. 24, 2023

(54) TRANSMISSION, A POWERTRAIN, AND A VEHICLE

(71) Applicant: VOLVO TRUCK CORPORATION, Gothenburg (SE)

(72) Inventors: Anders Hedman, Marstrand (SE); Johan Folkesson, Skene (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/835,533

(22) Filed: Jun. 8, 2022

(65) Prior Publication Data
US 2022/0396144 A1 Dec. 15, 2022

(30) Foreign Application Priority Data
Jun. 10, 2021 (EP) ..................................... 21178660

(51) Int. Cl.
*B60K 17/08* (2006.01)
*B60K 1/02* (2006.01)
(Continued)

(52) U.S. Cl.
CPC ............... *B60K 17/08* (2013.01); *B60K 1/02* (2013.01); *F16H 37/065* (2013.01);
(Continued)

(58) Field of Classification Search
CPC ................... F16H 3/091; F16H 37/065; F16H 2003/0826; F16H 2057/02034; B60K 1/02; B60K 17/08
See application file for complete search history.

(56) References Cited

U.S. PATENT DOCUMENTS

2009/0019967 A1   1/2009   Himmelmann

FOREIGN PATENT DOCUMENTS

| DE | 3822330 | * | 7/1989 |
| EP | 3296592 | * | 3/2018 |

(Continued)

OTHER PUBLICATIONS

Extended European Search Report, European Patent Application No. 21178660.3, dated Nov. 4, 2021, 9 pages.

*Primary Examiner* — William C Joyce
(74) *Attorney, Agent, or Firm* — Sage Patent Group

(57) ABSTRACT

A transmission comprises a first input shaft, a second input shaft, an output shaft, and an intermediate shaft. A first input shaft gearwheel, a second input shaft gearwheel, a first intermediate shaft gearwheel, a second intermediate shaft gearwheel, a first output shaft gearwheel drivingly connected to the first input shaft gearwheel, a second output shaft gearwheel in meshing engagement with the first intermediate shaft gearwheel, and a third output shaft gearwheel in meshing engagement with the second intermediate shaft gearwheel, are provided. A first shifting device is selectively settable to:
  a first shifting device first state, rotationally connecting the first output shaft gearwheel to the output shaft,
  a first shifting device neutral state, and
  a first shifting device second state, rotationally connecting the first output shaft gearwheel to the second output shaft gearwheel,
A second shifting device is selectively settable to:
  a second shifting device first state, rotationally connecting the second output shaft gearwheel to the output shaft,
  a second shifting device neutral state, and
(Continued)

a second shifting device second state, rotationally connecting the third output shaft gearwheel to the output shaft.

16 Claims, 9 Drawing Sheets

(51) Int. Cl.
*F16H 37/06* (2006.01)
*F16H 3/08* (2006.01)
*F16H 57/02* (2012.01)

(52) U.S. Cl.
CPC ............... *F16H 2003/0803* (2013.01); *F16H 2003/0826* (2013.01); *F16H 2057/02034* (2013.01); *F16H 2200/0021* (2013.01)

(56) References Cited

FOREIGN PATENT DOCUMENTS

| | | | |
|---|---|---|---|
| FR | 3077108 A1 | | 7/2019 |
| WO | WO 2012 055382 | * | 5/2012 |
| WO | WO 2017/080571 A1 | | 5/2017 |

* cited by examiner

TRANSMISSION, A POWERTRAIN, AND A VEHICLE

CROSS REFERENCE TO RELATED APPLICATIONS

This application claims foreign priority to European Patent Application No. 21178660.3, filed on Jun. 10, 2021, the disclosure and content of which is incorporated by reference herein in its entirety.

TECHNICAL FIELD

The invention relates to a transmission, a powertrain, and a vehicle.

The invention can be applied in heavy-duty vehicles, such as trucks, buses, and construction equipment. Although the invention will be described with respect to a truck, the invention is not restricted to this particular vehicle, but may also be used in other vehicles such as buses, trailers, wheel loaders, excavators, passenger cars, etc.

BACKGROUND

Electrically or partly electrically operated heavy-duty vehicles are becoming increasingly common. For heavy-duty vehicles, it may be desirable to provide more than one electric machine for propulsion of the vehicle, and also to provide electric power to auxiliary systems and for power take-off. In such powertrains including two propulsion units, a common transmission may be provided, transmitting torque from each one of the electric machines to a common output shaft used to propel a driven axle of the vehicle.

US 2009/0019967 discloses a powertrain including two electric machines and a common transmission for torque transmission from each of the electric machines to a common output shaft for driving the vehicle. Each electric machine is connected to a corresponding input shaft, on which input gearwheels are provided for selective transmission of torque via corresponding output gearwheels provided on the common output shaft.

There is an ongoing strive to improve the powertrains of electrically operated vehicles and combine powertrain efficiency with a broad power range.

SUMMARY

A primary object of the invention is to provide an in at least some aspect improved transmission suitable for a powertrain comprising two propulsion units, such as two electric machines.

According to a first aspect of the invention, the above object is achieved by a transmission according to claim 1. The transmission comprises:
  a first input shaft, a second input shaft, an output shaft, and an intermediate shaft,
  a first input shaft gearwheel arranged on the first input shaft,
  a second input shaft gearwheel arranged on the second input shaft,
  a first intermediate shaft gearwheel and a second intermediate shaft gearwheel arranged on the intermediate shaft,
  a set of output shaft gearwheels rotatably arranged on the output shaft, comprising at least:
    a first output shaft gearwheel arranged in driving connection with the first input shaft gearwheel,
    a second output shaft gearwheel arranged in meshing engagement with the first intermediate shaft gearwheel, and
    a third output shaft gearwheel arranged in meshing engagement with the second intermediate shaft gearwheel,
  a first shifting device selectively settable to one of:
    a first shifting device first state, in which it rotationally connects the first output shaft gearwheel to the output shaft,
    a first shifting device neutral state, and
    a first shifting device second state, in which it rotationally connects the first output shaft gearwheel to the second output shaft gearwheel,
  a second shifting device selectively settable to one of:
    a second shifting device first state, in which it rotationally connects the second output shaft gearwheel to the output shaft, and in which torque is transmittable from the second input shaft to the output shaft via the second input shaft gearwheel, without using any one of the second intermediate shaft gearwheel and the third output shaft gearwheel,
    a second shifting device neutral state, and
    a second shifting device second state, in which it rotationally connects the third output shaft gearwheel to the output shaft, and in which torque is transmittable from the second input shaft to the output shaft via at least the input shaft gearwheel, the second intermediate shaft gearwheel and the third output shaft gearwheel.

The transmission disclosed herein is able to provide at least four different gear ratios using merely two shifting devices, each settable to one of three different states, or positions. The transmission thereby becomes robust and compact, while it also fulfils high demands on torque capacity and efficiency. It can furthermore be used to transmit torque from two different propulsion units to the driven wheels of a vehicle, either from one at a time or from both simultaneously. The transmission also allows uninterrupted torque transmission during acceleration and deceleration of the vehicle using two propulsion units, since one of the input shafts can always be used for torque transfer while the other one is disconnected for gear changing.

The output shaft gearwheels are rotatably arranged on the output shaft. In other words, they are arranged to be rotatable with respect to the output shaft around a common axis of rotation, corresponding to a longitudinal axis of the output shaft.

By the term "rotationally connect to" is intended "connect for common rotation with". For example, in the first shifting device first state, the first shifting device connects the first output shaft gearwheel for common rotation with the output shaft around the common axis of rotation, so that the output shaft gearwheel is rotationally connected to the output shaft.

By a "driving connection" is herein intended that torque can be transmitted between the gearwheels, such as by the gearwheels being in meshing engagement, or that the first output shaft gearwheel is in meshing engagement with another gearwheel, which is in turn in meshing connection with the first input shaft gearwheel. The meshing engagement is to be understood as a permanent meshing engagement.

Optionally, in the first shifting device first state, torque is directly transmittable from the first input shaft to the output shaft via the first input shaft gearwheel and the first output shaft gearwheel. For this purpose, the first input shaft gearwheel may be in meshing engagement with the first output shaft gearwheel, providing an efficient torque transfer between the first input shaft and the output shaft without intermediate gearwheels.

Optionally, in the first shifting device second state, torque is transmittable from the first input shaft to the output shaft via the intermediate shaft. In other words, there is no direct torque transfer between meshing gearwheels on the first input shaft and the output shaft, respectively.

Optionally, the first input shaft gearwheel is fixed for common rotation with the first input shaft and/or the second input shaft gearwheel is fixed for common rotation with the second input shaft. This improves the robustness of the transmission since no clutch or similar is necessary for fixing the first and/or the second gearwheel/s to the respective input shaft/s. Each of the two input shafts can be disconnected from the output shaft using the first and second shifting devices.

Optionally, the first intermediate shaft gearwheel is fixed for common rotation with the intermediate shaft, and/or the second intermediate shaft gear is fixed for common rotation with the intermediate shaft.

Optionally, the transmission comprises a fourth output shaft gearwheel rotatably arranged on the output shaft, the fourth output shaft gearwheel being fixed for common rotation with the second output shaft gearwheel.

In the embodiments referred to above, "fixed for common rotation" is herein to be understood as "permanently fixed for common rotation".

Optionally, the second input shaft gearwheel is arranged in driving connection with the fourth output shaft gearwheel.

Optionally, the second input shaft gearwheel is arranged in meshing engagement with the fourth output shaft gearwheel. An efficient torque transfer is thereby provided between the second input shaft and the output shaft in the second shifting device first state.

Optionally, the second input shaft gearwheel is arranged in driving connection with the first intermediate shaft gearwheel, such as by means of meshing engagement between the two gearwheels, or by meshing engagement with an intermediate gearwheel which is in turn in meshing engagement with each of the two gearwheels. In this case, the fourth output shaft gearwheel mentioned above may be omitted.

Optionally, the transmission further comprises a first input shaft second gearwheel arranged in driving connection, such as in meshing engagement, with any one of the output shaft gearwheels other than the first output shaft gearwheel. When the transmission comprises the fourth output shaft gearwheel, the first input shaft second gearwheel may advantageously be drivingly connected to the fourth output shaft gearwheel, although it may alternatively be drivingly connected to any one of the second and third output shaft gearwheels.

Optionally, the transmission further comprises a third shifting device for selectively connecting the first input shaft second gearwheel for common rotation with the first input shaft. Hereby, the first input shaft second gearwheel can be in permanent meshing engagement with the output shaft gearwheel without torque transfer unless it is connected to the first input shaft using the third shifting device. The third shifting device may be arranged for shifting between two states only, i.e. a connecting and a disconnecting state.

Optionally, the gearwheels are dimensioned so that a speed ratio for torque transfer between the first input shaft and the first output shaft gearwheel is higher than a speed ratio for torque transfer between the second input shaft and the second output shaft gearwheel. This enables an efficient gear shifting sequence with uninterrupted torque transfer when accelerating a vehicle from a stand-still.

According to a second aspect of the invention, at least the primary object is also achieved by a powertrain according to claim 13. The powertrain comprises a first propulsion unit, a second propulsion unit and the transmission according to the first aspect, wherein the first input shaft of the transmission is drivingly connected to the first propulsion unit and wherein the second input shaft of the transmission is drivingly connected to the second propulsion unit. Advantages and advantageous features of the powertrain according to the invention appear from the above description of the first aspect of the invention.

Optionally, at least one of the first propulsion unit and the second propulsion unit is an electric machine. Both propulsion units may be electric machines of the same type or of different types. At least one of the propulsion units may alternatively be an internal combustion engine.

The first propulsion unit may be directly coupled to the first input shaft, or it may be coupled to the first input shaft via a clutch member, such as a friction clutch. The second propulsion unit may be directly coupled to the second input shaft, or it may be coupled to the second input shaft via a clutch member, such as a friction clutch.

According to a third aspect of the invention, at least the primary object is also achieved by a vehicle comprising a powertrain according to the second aspect. The vehicle may for example be a fully electrified vehicle, or a hybrid vehicle comprising also at least one combustion engine in addition to the first and second electric machines. Advantages and advantageous features of the vehicle according to the invention appear from the above description of the first and second aspects of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
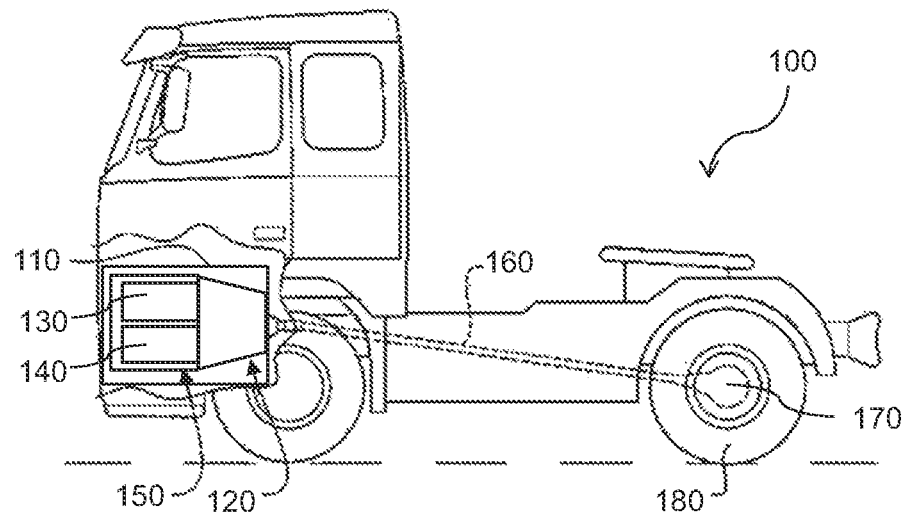
FIG. 1 schematically illustrates a vehicle according to an embodiment of the invention, FIG. 2 schematically illustrates a transmission according to a first embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

A vehicle 100 in the form of a truck according to an embodiment of the invention is schematically shown in FIG. 1. The vehicle 100 includes a powertrain 110 with a propulsion unit assembly 150 for propulsion of the vehicle 100. The propulsion unit assembly 150 comprises at least two propulsion units in the form of electric machines 130, 140 connected to a transmission 120 and configured to be powered by an electric energy storage system (not shown) of the vehicle 100. The transmission 120 is arranged to transfer torque from the propulsion unit assembly 150 to a propeller shaft 160 connecting the transmission 120 to a driven axle 170 that drives driven wheels 180 of the vehicle 100. Thus, in the shown embodiment, the vehicle 100 is a fully electrified vehicle configured to be driven solely by the propulsion unit assembly 150. The vehicle 100 may be arranged with more than one driven axle, such as two or more driven axles. The propulsion unit assembly 150 of the vehicle 100 may comprise more than two electric machines, such as three or four electric machines. The vehicle may also be a hybrid vehicle, provided with a combustion engine in addition to the electric machines 130, 140. The electric machines 130, 140 may be in the form of electric motors/generators.

Of course, the vehicle and the powertrain may have many different configurations. By way of example, the electric machine assembly 150 and the transmission 120 do not need to be provided at a front of the vehicle, but may e.g. be combined with a rear axle of the vehicle.

Figure 2:
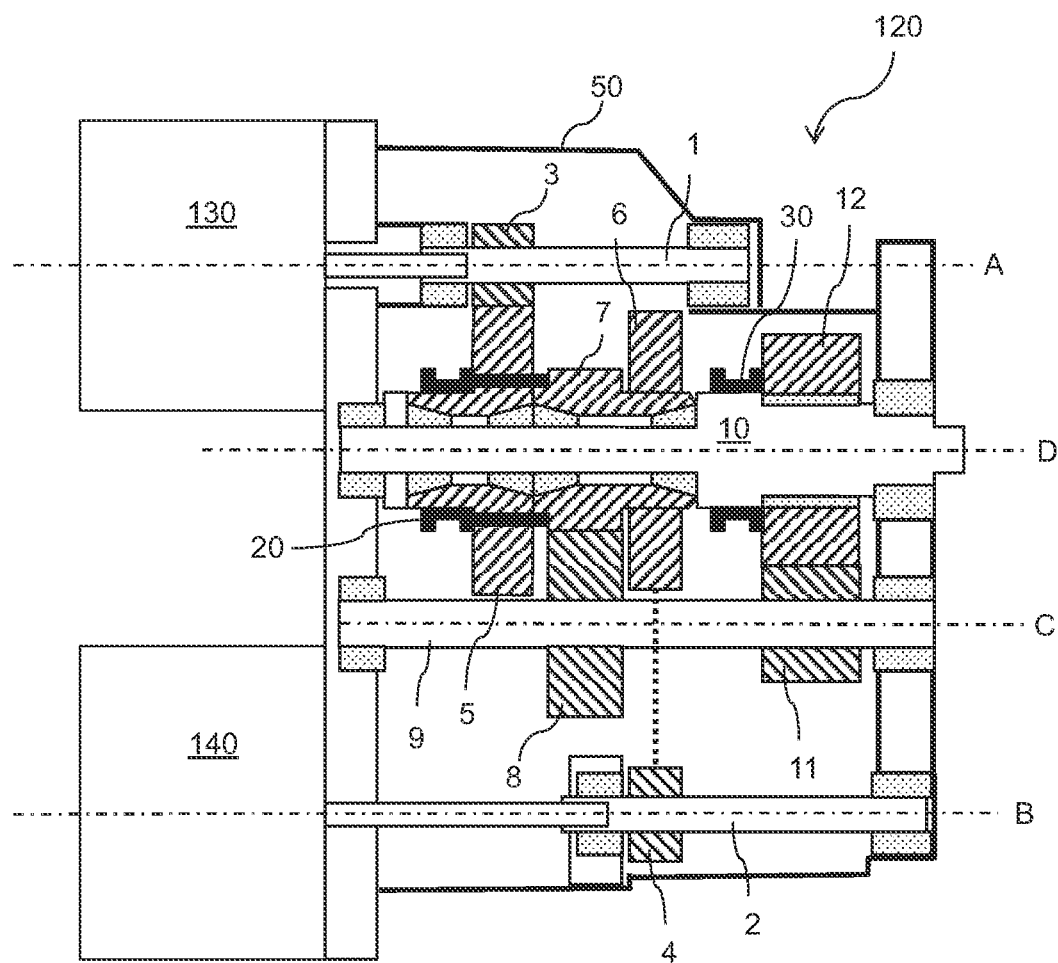

FIG. 2 illustrates a transmission 120 according to a first embodiment of the invention. The transmission comprises a first input shaft 1 drivingly connected to the first electric machine 130 and a second input shaft 2 drivingly connected to the second electric machine 140. The transmission 120 further comprises an output shaft 10 configured to be drivingly connected to the propeller shaft 160 of the vehicle 100, and an intermediate shaft 9. The shafts 1, 2, 9, 10 are mounted to a transmission housing 50 using bearings, shown as dotted areas in the figures.

A first input shaft gearwheel 3 is arranged on the first input shaft 1 and fixed for common rotation therewith around a longitudinal axis A of the first input shaft 1. A second input shaft gearwheel 4 is arranged on the second input shaft 2 and fixed for common rotation therewith around a longitudinal axis B of the second input shaft 2. A first intermediate shaft gearwheel 8 and a second intermediate shaft gearwheel 11 are arranged on the intermediate shaft 9 and fixed for common rotation therewith around a longitudinal axis C of the intermediate shaft 9. A set of output shaft gearwheels are rotatably arranged on the output shaft 10, i.e. rotatable around a longitudinal axis D of the output shaft 10, independently of the output shaft 10. Bearings are for this purpose provided between the respective output shaft gearwheels and the output shaft 10. The set of output shaft gearwheels include:

a first output shaft gearwheel 5 arranged in meshing engagement with the first input shaft gearwheel 3, a second output shaft gearwheel 7 arranged in meshing engagement with the first intermediate shaft gearwheel 8, a third output shaft gearwheel 12 arranged in meshing engagement with the second intermediate shaft gearwheel 11, and a fourth output shaft gearwheel 6 arranged in meshing engagement with the second input shaft gearwheel 4, as illustrated by the dotted line in FIG. 1, and permanently fixed to the second output shaft gearwheel 7.

All output shaft gearwheels 5, 6, 7, 12 have different diameters, indicative of different number of teeth on the respective gearwheels.

The transmission 120 further comprises a first shifting device 20 and a second shifting device 30, which may e.g. be sleeve members that may be referred to as clutch sleeves, clutch collars, engaging sleeves, or similar. Shift forks (not shown) may be provided for moving the shifting devices 20, 30 so as to change gears. Gear shifting may be controlled from a transmission control unit (not shown) using e.g. electric, hydraulic, or pneumatic actuators to move the shift forks.

The first shifting device 20 is selectively settable to one of a first shifting device first state, a first shifting device neutral state, and a first shifting device second state.

Figure 5:
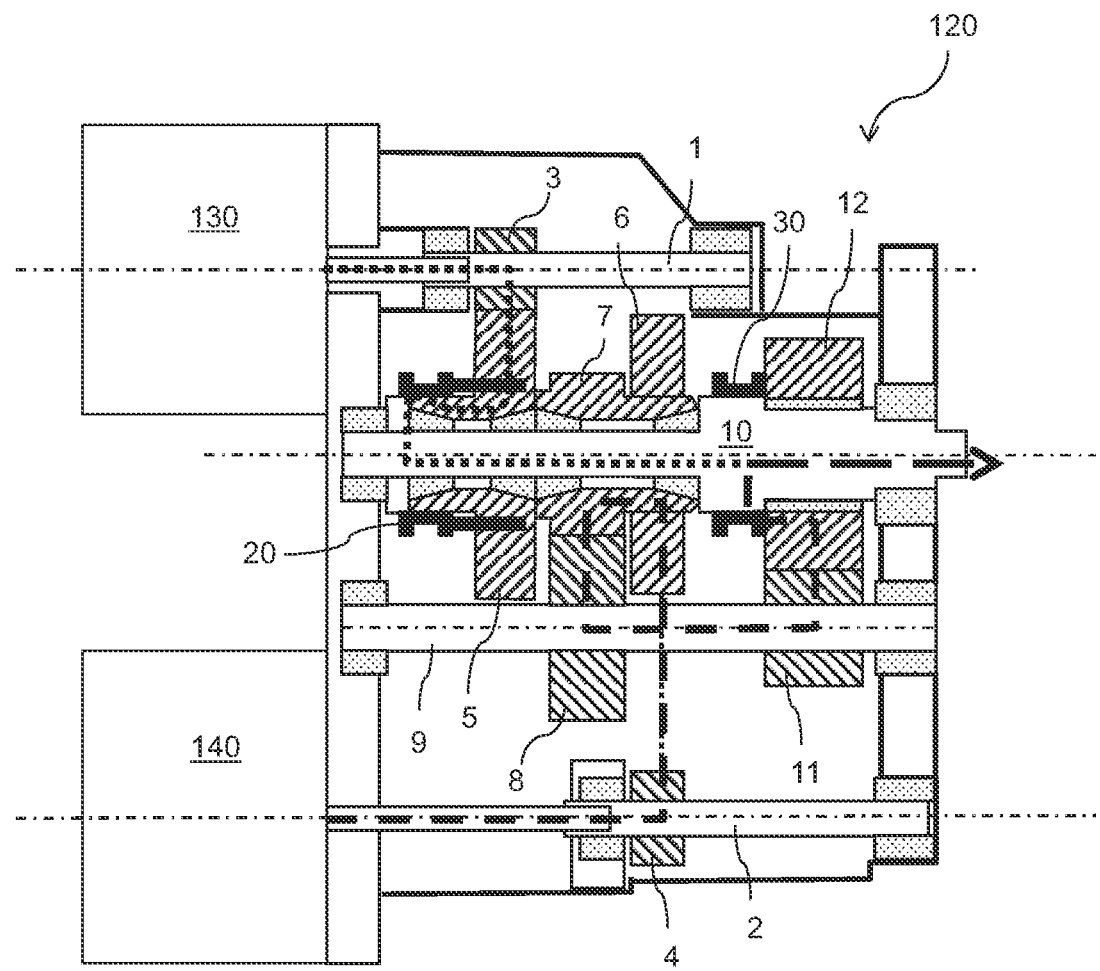
FIG. 5 illustrates power flow through the transmission in FIG. 2 in a third state.
Figure 6:
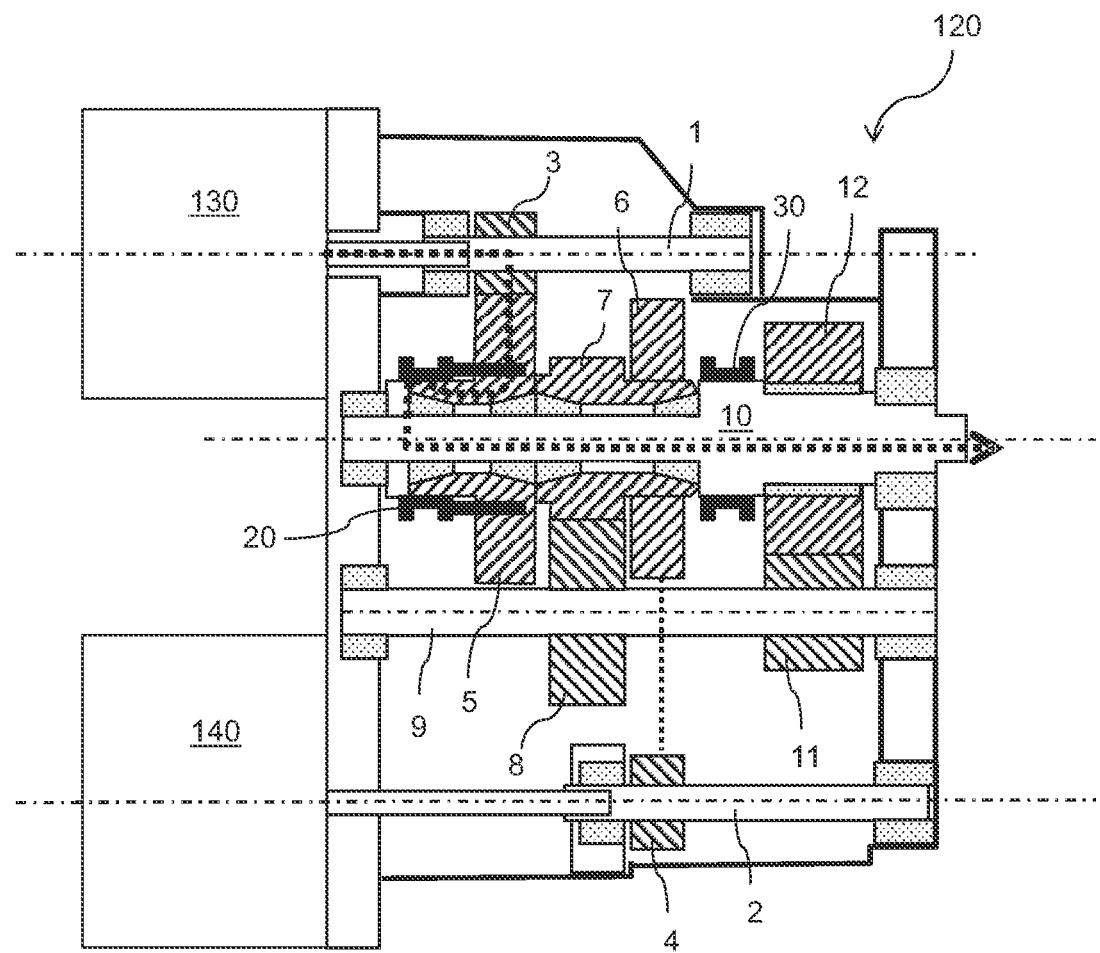
FIG. 6 illustrates power flow through the transmission in FIG. 2 in a fourth state.
Figure 7:
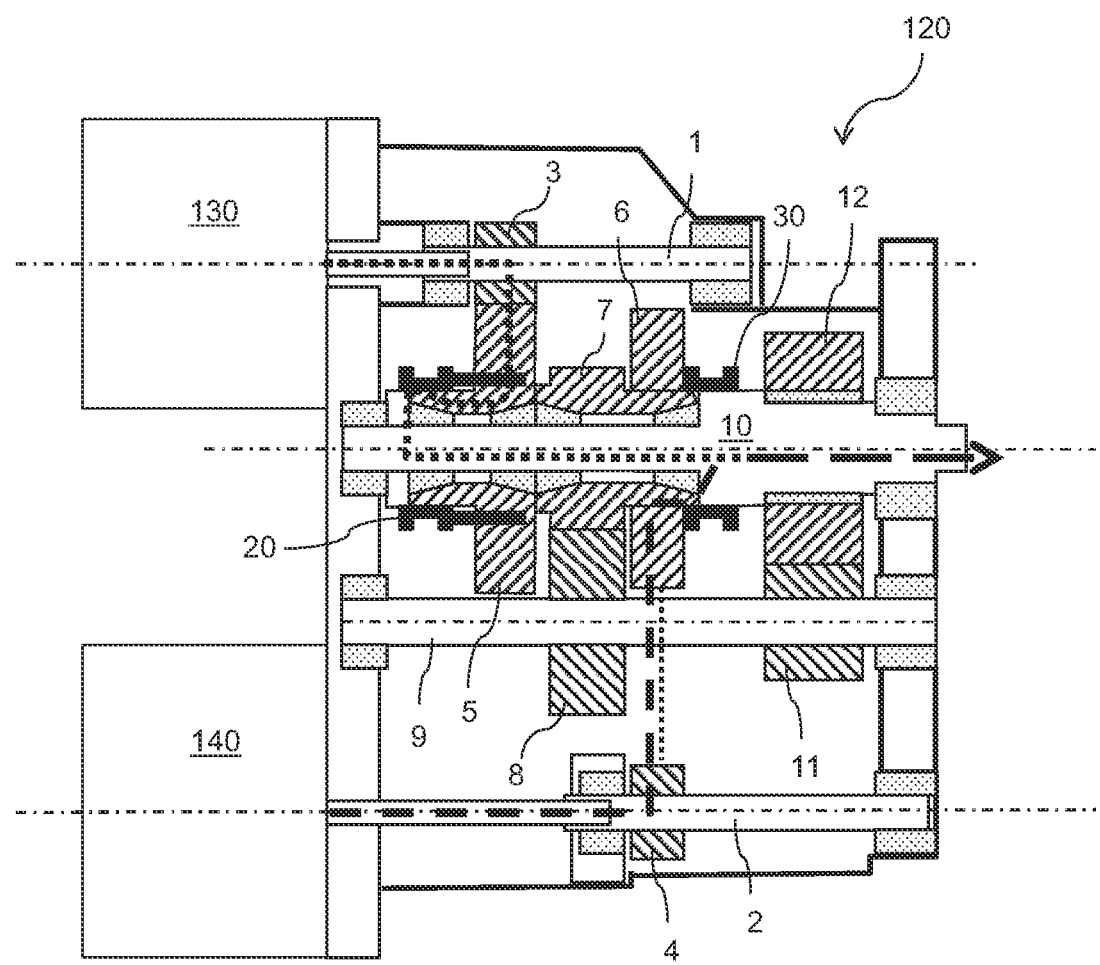
FIG. 7 illustrates power flow through the transmission in FIG. 2 in a fifth state.

In the first shifting device first state, shown in FIGS. 5-7, the first shifting device 20 rotationally connects the first output shaft gearwheel 5 to the output shaft 10, i.e. it connects the first output shaft gearwheel 5 and the output shaft 10 for common rotation. Torque from the first input shaft 1 may thereby be transmitted to the output shaft 10 via the first input shaft gearwheel 3 fixed on the first input shaft 1 and the first output shaft gearwheel 5, which are in the shown embodiment in meshing engagement.

Figure 4:
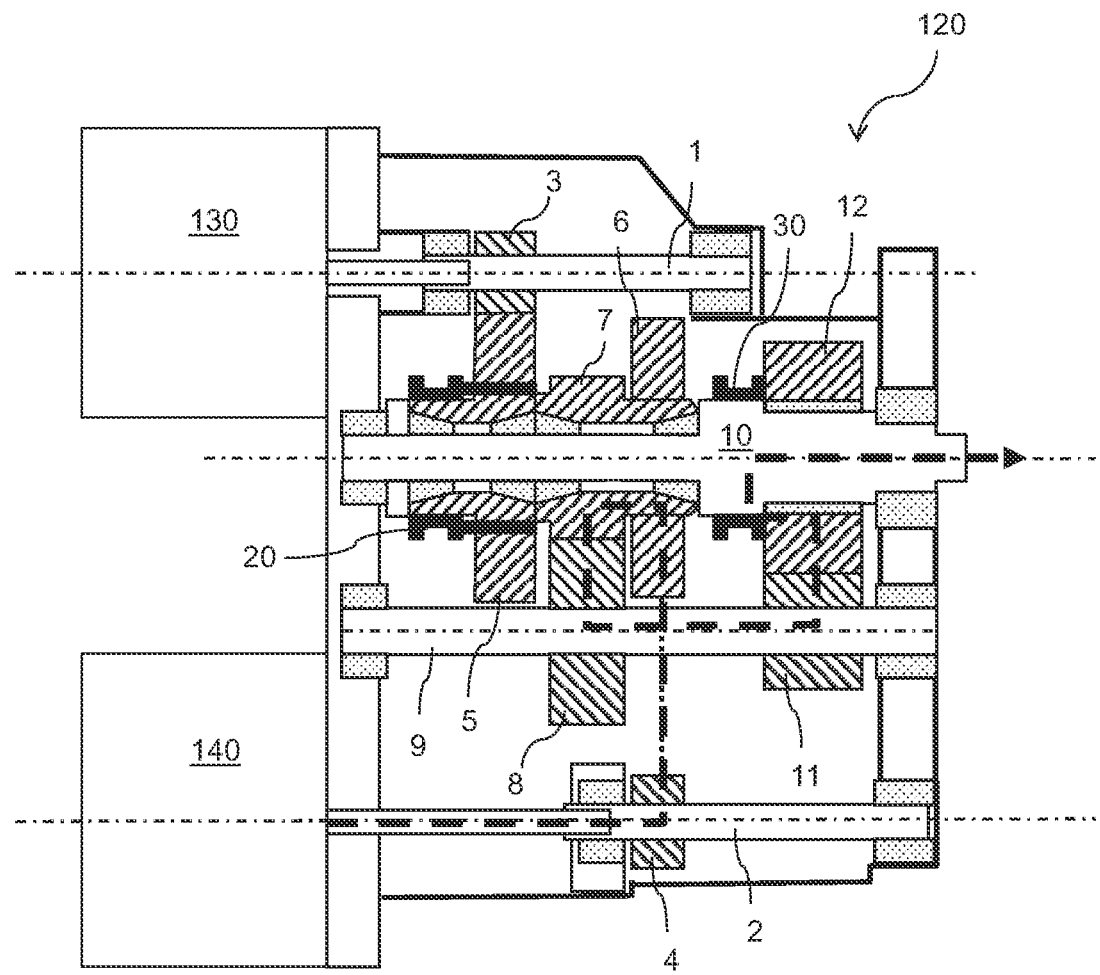
FIG. 4 illustrates power flow through the transmission in FIG. 2 in a second state.
Figure 8:
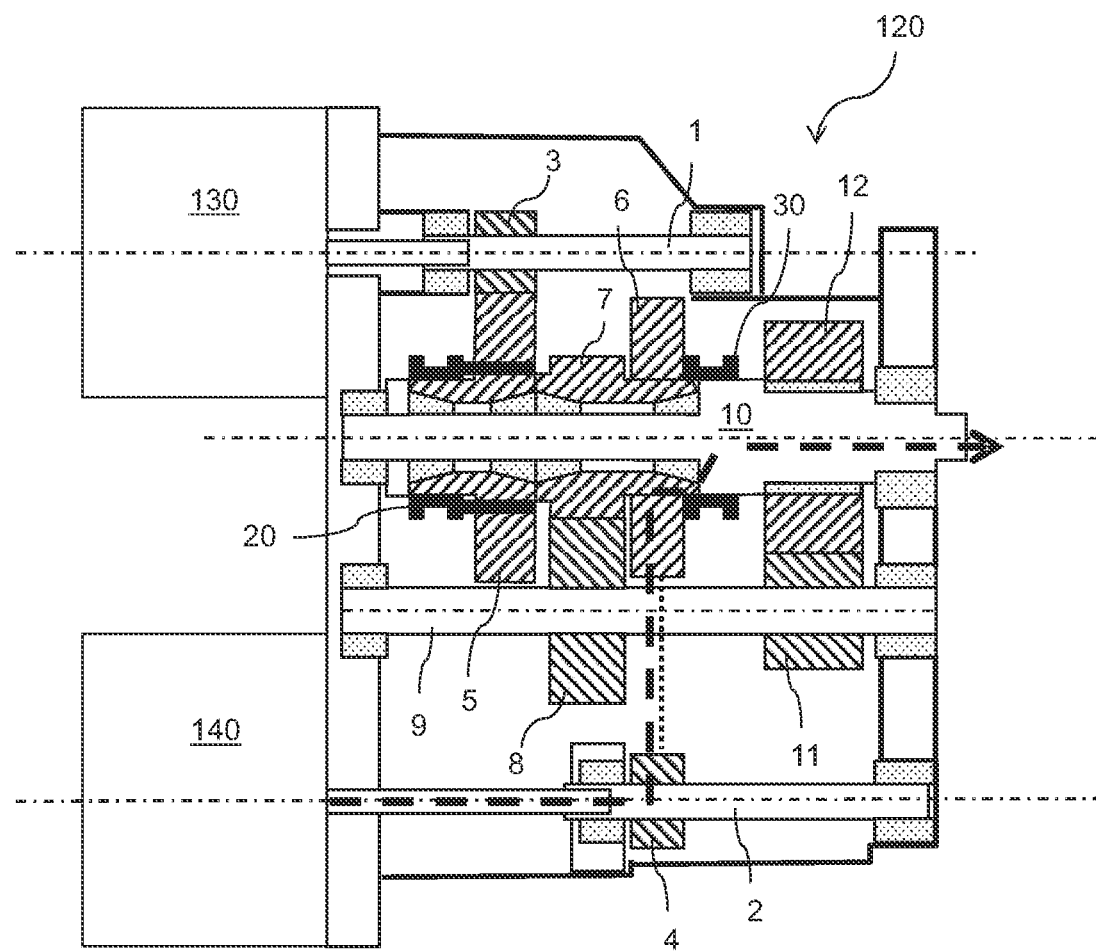
FIG. 8 illustrates power flow through the transmission in FIG. 2 in a sixth state, FIG. 9 schematically illustrates a transmission according to a second embodiment of the invention, and FIG. 10 schematically illustrates a transmission according to a third embodiment of the invention.

In the first shifting device neutral state, shown in FIG. 4 and FIG. 8, the first shifting device allows the first output shaft gearwheel 5 to rotate with respect to the second output shaft gearwheel 7 as well as with respect to the output shaft 10.

Figure 3:
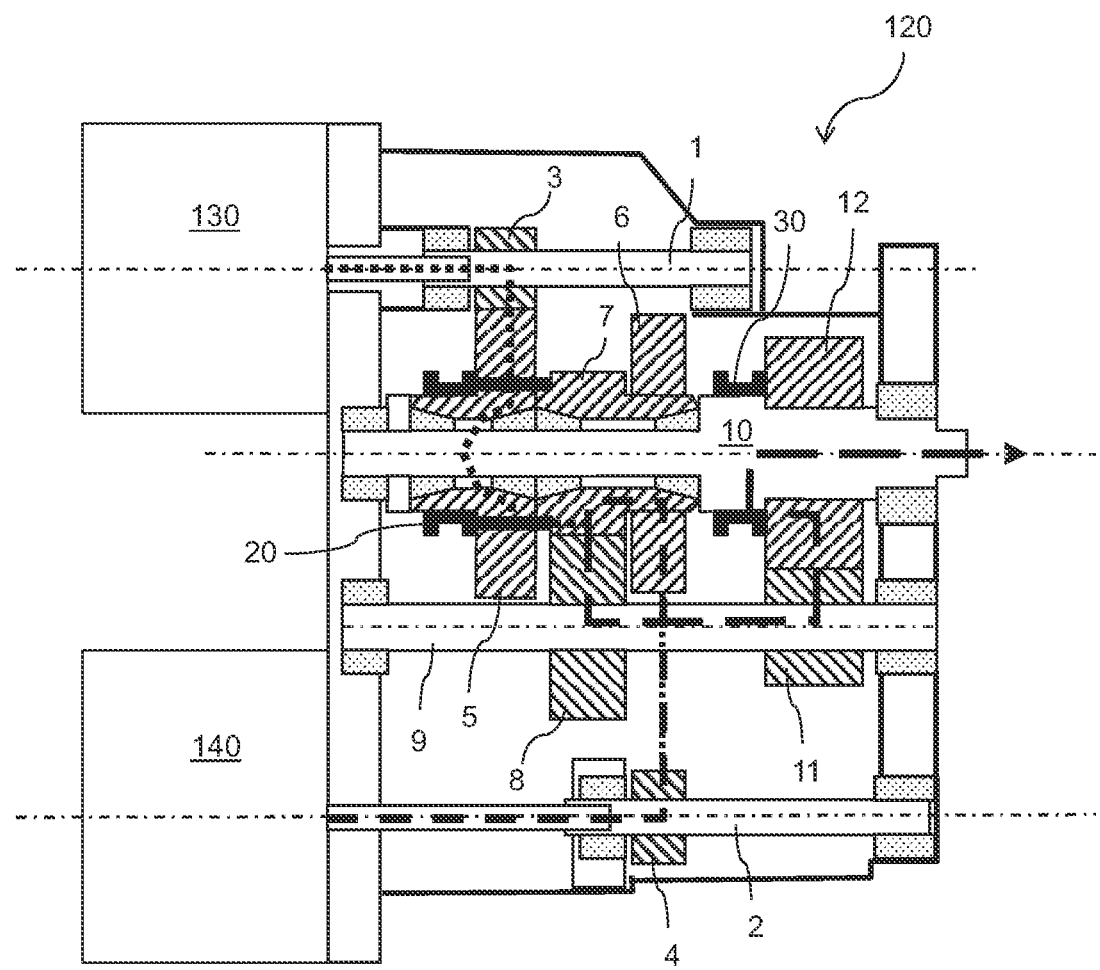
FIG. 3 illustrates power flow through the transmission in FIG. 2 in a first state.

In the first shifting device second state, shown in FIG. 3, the first shifting device 20 rotationally connects the first output shaft gearwheel 5 to the second output shaft gearwheel 7. In this state, the first output shaft gearwheel 5 may or may not be allowed to rotate with respect to the output shaft 10, depending on a state of the second shifting device 30.

The second shifting device 30 is selectively settable to one of a second shifting device first state, a second shifting device neutral state, and a second shifting device second state.

In the second shifting device first state, shown in FIG. 7 and FIG. 8, the second shifting device 30 rotationally connects the second output shaft gearwheel 7 to the output shaft 10. Thereby, in the shown embodiment, also the fourth output shaft gearwheel 6 is connected for common rotation with the output shaft 10. Torque is transmittable from the second input shaft 2 to the output shaft 10 via the second input shaft gearwheel 4, without using, i.e. without transmitting torque via, any one of the second intermediate shaft gearwheel 11 and the third output shaft gearwheel 12. Instead, in the shown embodiment, torque is transmitted via meshing engagement between the second input shaft gearwheel 4, fixed on the second input shaft 2, and the fourth output shaft gearwheel 6.

In the second shifting device neutral state, shown in FIG. 6, the second shifting device 30 allows the second output shaft gearwheel 7 and the third output shaft gearwheel 12 to rotate with respect to the output shaft 10 as well as with respect to one another.

In the second shifting device second state, shown in FIGS. 3-5, the second shifting device 30 rotationally connects the third output shaft gearwheel 12 to the output shaft 12. Torque is in this state transmittable from the second input shaft 2 to the output shaft 10 via the input shaft gearwheel 4, the second intermediate shaft gearwheel 11 and the third output shaft gearwheel 12. In the shown embodiment, torque is transmitted via meshing engagement between the second input shaft gearwheel 4 and the fourth input shaft gearwheel 6, meshing engagement between the second output shaft gearwheel 7 (fixed to the fourth input shaft gearwheel 6) and the first intermediate shaft gearwheel 8, and meshing engagement between the second intermediate shaft gearwheel 11 and the third output shaft gearwheel 12.

The gearwheels of the transmission 120 are dimensioned so that at least four different speed ratios for torque transfer are provided. The gearwheels are dimensioned so that the speed ratio for torque transfer between the first input shaft 1 and the first output shaft gearwheel 5 is higher than the speed ratio for torque transfer between the second input shaft 2 and the second output shaft gearwheel 7.

FIGS. 3-8 illustrate the power flows in a gear shifting sequence using the transmission 120 according to the first embodiment for starting and accelerating a vehicle 100. As will be seen, an uninterrupted power flow is provided during the entire gear shifting sequence.

In FIG. 3, the transmission 120 is in a starting configuration with the first shifting device 20 set to the first shifting device second state and the second shifting device 30 set to the second shifting device second state. Both electric machines 130, 140 are drivingly connected to the output shaft 10 via the intermediate shaft 9 and are used for propulsion of the vehicle 100 at low vehicle speed.

In FIG. 4, the vehicle has accelerated, and it is time to shift to a higher gear (i.e. a lower speed ratio) for torque transmission between the first input shaft 1 and the output shaft 10. The second shifting device 30 is still in the second shifting device second state, so that the second electric machine 140 is used for propulsion of the vehicle 100, but the first shifting device 20 has been moved to the first shifting device neutral state.

In FIG. 5, the second shifting device 30 is still in the second shifting device second state and the first shifting device 20 has been moved to the first shifting device first state, so that both electric machines 130, 140 are again used to accelerate the vehicle 100.

In FIG. 6, it is time to shift to a higher gear for torque transmission between the second input shaft 2 and the output shaft 10. The first shifting device 20 remains in the first shifting device first state, so that the first electric machine 130 is used for driving the vehicle 100, while the second shifting device 30 has been moved to the second shifting device neutral state.

In FIG. 7, the first shifting device 20 remains in the first shifting device first state, and the second shifting device 30 has been moved to the second shifting device first state. Both electric machines 130, 140 are used for driving the vehicle 100 at a relatively high vehicle speed and with relatively small power losses thanks to the low number of meshing components used for driving the output shaft 10.

In FIG. 8, the second shifting device 30 remains in the second shifting device first state, while the first electric machine 130 has been disconnected by moving the first shifting device 20 to the first shifting device neutral state. Thus, the vehicle 100 is driving at a relatively high speed with a relatively low power demand, using only the second electric machine 140 for propulsion.

Figure 9:
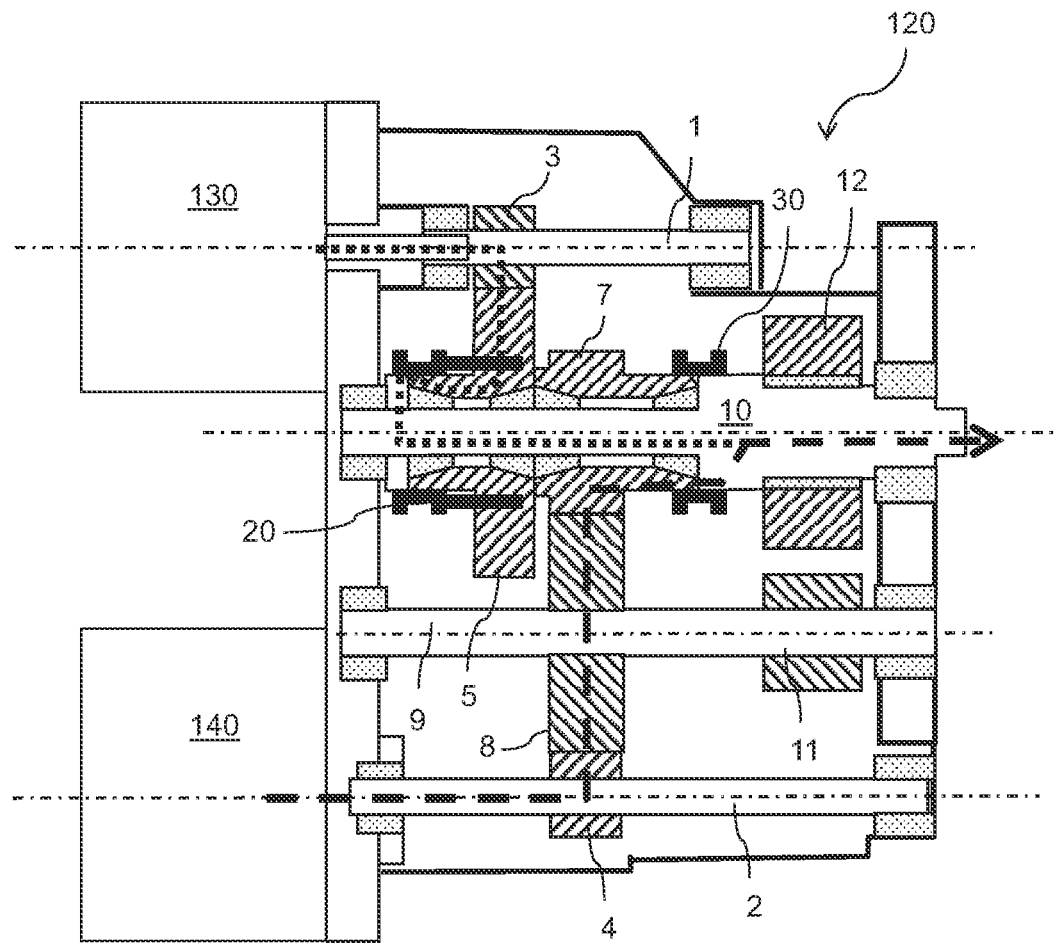

FIG. 9 illustrates a transmission 120 according to a second embodiment of the invention. The transmission 120 according to the second embodiment differs from the first embodiment in that, instead of providing a fourth output shaft gearwheel 6, the second input shaft gear 4 is drivingly connected to the first intermediate shaft gearwheel 8, herein by meshing engagement. Thus, in the second shifting device first state, illustrated in FIG. 9, torque from the second output shaft 2 is transmitted to the output shaft 10 via the second input shaft gear 4, the first intermediate shaft gear 8, and the second output shaft gear 7, which is in meshing engagement with the first intermediate shaft gear 8. In this case, the second electric machine 140 and the first electric machine 130 rotate in different directions.

Figure 10:
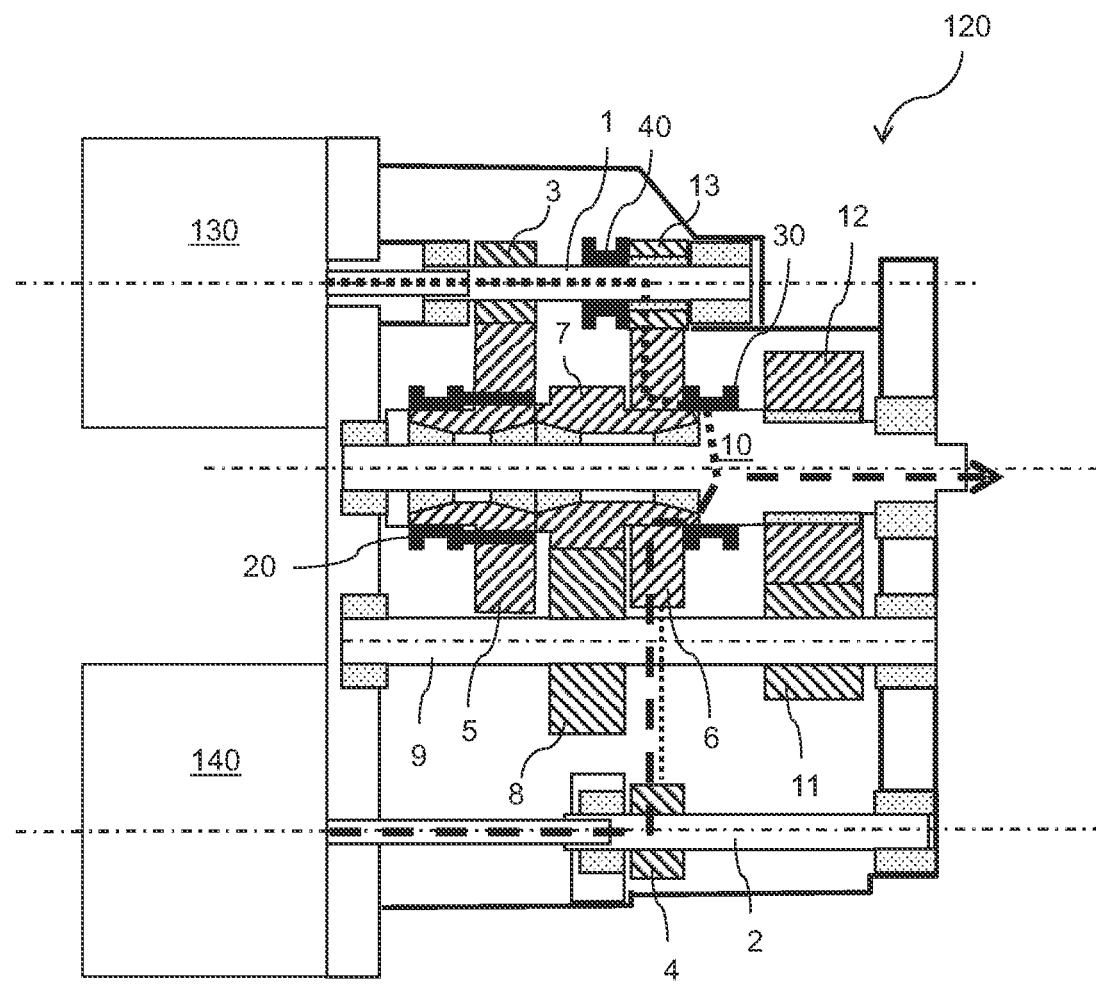

FIG. 10 illustrates a transmission 120 according to a third embodiment of the invention. The transmission 120 according to the third embodiment differs from the first embodiment in that a first input shaft second gearwheel 13 is arranged in permanent meshing engagement with the fourth output shaft gearwheel 6. The first input shaft second gearwheel 13 is rotatably arranged on the first input shaft 1 and a third shifting device 40, such as a clutch collar, is arranged for selectively connecting the first input shaft second gearwheel 13 to the first input shaft 1 for common rotation therewith. When the third shifting device 40 connects the first input shaft second gearwheel 13 to the first input shaft 1, and when the second shifting device 30 is in the second shifting device first state, torque is transmitted between the first input shaft 1 and the output shaft 10 via the first input shaft second gearwheel 13 and the fourth output shaft gearwheel 6 as illustrated in FIG. 10.

The first shifting device 20 is in the shown embodiments illustrated as a single clutch collar extending through the first output shaft gearwheel 5, but it is also possible to provide separate clutch collars on each side of the first output shaft gearwheel 5, which are movable together using a single actuator.

Features from the first, second and third embodiment may of course be combined so that e.g. a first input shaft second gearwheel is provided in an embodiment without the fourth output shaft gearwheel, in which case it may be drivingly connected to another one of the output shaft gearwheels. Furthermore, an additional intermediate shaft may be provided for torque transfer between the first input shaft 1 and the output shaft 10, or even two additional intermediate shafts. For example, an additional intermediate shaft could be arranged such that the second input shaft gearwheel 4 is in meshing engagement with a non-illustrated intermediate shaft gearwheel, in turn in meshing engagement with either the first intermediate shaft gearwheel 8 or the fourth output shaft gearwheel 6. It is also possible to provide two second input shaft gearwheels on the second input shaft 2, similarly to the third embodiment illustrated in FIG. 10.

Although not illustrated in the drawings a planetary gear set and/or a retarder may be connected to the output shaft 10 for further reduction of rotational speed.

It is to be understood that the present invention is not limited to the embodiments described above and illustrated in the drawings; rather, the skilled person will recognize that many changes and modifications may be made within the scope of the appended claims.

The invention claimed is:

1. A transmission, comprising:
    a first input shaft, a second input shaft, an output shaft, and an intermediate shaft,
    a first input shaft gearwheel arranged on the first input shaft, a second input shaft gearwheel arranged on the second input shaft, a first intermediate shaft gearwheel and a second intermediate shaft gearwheel arranged on the intermediate shaft, a set of output shaft gearwheels rotatably arranged on the output shaft, comprising at least:

a first output shaft gearwheel arranged in driving connection with the first input shaft gearwheel, a second output shaft gearwheel arranged in meshing engagement with the first intermediate shaft gearwheel, and a third output shaft gearwheel arranged in meshing engagement with the second intermediate shaft gearwheel, a first shifting device selectively settable to one of:

a first shifting device first state, in which it rotationally connects the first output shaft gearwheel to the output shaft, a first shifting device neutral state, and a first shifting device second state, in which it rotationally connects the first output shaft gearwheel to the second output shaft gearwheel, a second shifting device selectively settable to one of:

a second shifting device first state, in which it rotationally connects the second output shaft gearwheel to the output shaft, and in which torque is transmittable from the second input shaft to the output shaft via the second input shaft gearwheel, without using any one of the second intermediate shaft gearwheel and the third output shaft gearwheel, a second shifting device neutral state, and a second shifting device second state, in which it rotationally connects the third output shaft gearwheel to the output shaft, and in which torque is transmittable from the second input shaft to the output shaft via at least the second input shaft gear wheel, the second intermediate shaft gearwheel and the third output shaft gearwheel.

2. The transmission according to claim 1, wherein, in the first shifting device first state, torque is directly transmittable from the first input shaft to the output shaft via the first input shaft gearwheel and the first output shaft gearwheel.

3. The transmission according to claim 1, wherein, in the first shifting device second state, torque is transmittable from the first input shaft to the output shaft via the intermediate shaft.

4. The transmission according to claim 1, wherein the first input shaft gearwheel is fixed for common rotation with the first input shaft, and/or wherein the second input shaft gearwheel is fixed for common rotation with the second input shaft.

5. The transmission according to claim 1, wherein the first intermediate shaft gearwheel is fixed for common rotation with the intermediate shaft, and/or wherein the second intermediate shaft gear is fixed for common rotation with the intermediate shaft.

6. The transmission according to claim 1, further comprising a fourth output shaft gearwheel rotatably arranged on the output shaft, the fourth output shaft gearwheel being fixed for common rotation with the second output shaft gearwheel.

7. The transmission according to claim 6, wherein the second input shaft gearwheel is arranged in driving connection with the fourth output shaft gearwheel.

8. The transmission according to claim 6, wherein the second input shaft gearwheel is arranged in meshing engagement with the fourth output shaft gearwheel.

9. The transmission according to claim 1, wherein the second input shaft gearwheel is arranged in driving connection with the first intermediate shaft gearwheel.

10. The transmission according to claim 1, further comprising a first input shaft second gearwheel arranged in driving connection with any one of the output shaft gearwheels other than the first output shaft gearwheel.

11. The transmission according to claim 10, further comprising a third shifting device for selectively connecting the first input shaft second gearwheel for common rotation with the first input shaft.

12. The transmission according to claim 1, wherein the gearwheels are dimensioned so that a speed ratio for torque transfer between the first input shaft and the first output shaft gearwheel is higher than a speed ratio for torque transfer between the second input shaft and the second output shaft gearwheel.

13. A powertrain comprising a first propulsion unit, a second propulsion unit and the transmission according to claim 1, wherein the first input shaft of the transmission is drivingly connected to the first propulsion unit and wherein the second input shaft of the transmission is drivingly connected to the second propulsion unit.

14. A powertrain according to claim 13, wherein at least one of the first propulsion unit and the second propulsion unit is an electric machine.

15. A vehicle comprising a powertrain according to claim 14.

16. A vehicle comprising the powertrain according to claim 13.

* * * * *